March 23, 1943.  A. A. FORSBERG  2,314,858
VACUUM CLEANER
Filed Sept. 26, 1942
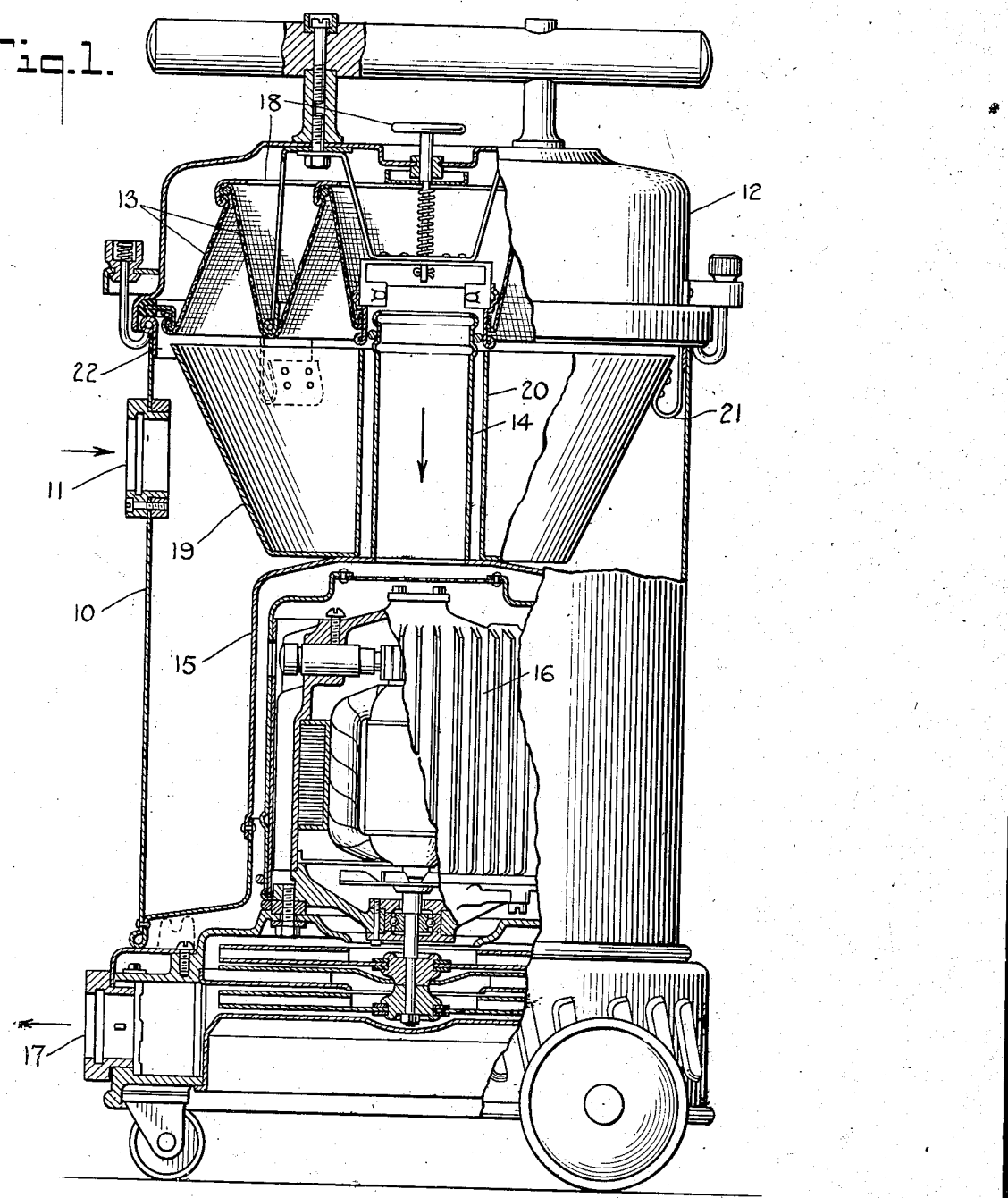
Fig.1.
Fig.2.
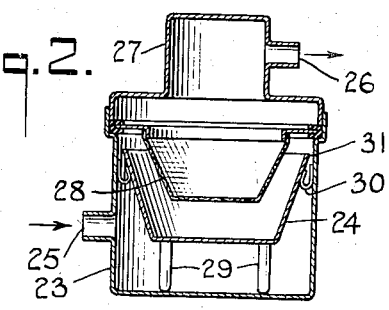
Axel Albert Forsberg
INVENTOR
BY
Murray Robinson
ATTORNEY Patented Mar. 23, 1943

2,314,858

UNITED STATES PATENT OFFICE 2,314,858

VACUUM CLEANER

Axel Albert Forsberg, Stockholm, Sweden

Application September 26, 1942, Serial No. 459,744
In Sweden July 5, 1941

4 Claims. (Cl. 183—67)

My invention relates to vacuum cleaners of the kind in which heavier particles entrained through the suction conduit of the apparatus fall down directly into a usually cylindrical dust collector, whereas the lighter dust particles first settle on the surface of a so-called roof filter provided in the upper part of said collector or above it, from which filter they then likewise fall to the bottom of the dust collector. The invention relates to an arrangement in vacuum cleaners of said kind for the purpose of separating in a simple manner the dust retained by the filter from those heavier particles, such as metal parts, which have been directly supplied to the dust collector and which, if desired, are to be utilized.

The invention is characterized chiefly in that a suitably detachable inset container is arranged above the entry of the suction conduit into the dust collector for the purpose of collecting the lighter dust particles falling down from the roof filter, said particles being thus prevented from mixing with the heavier particles in the underlying dust collector. The inset container may suitably be arranged in the dust collector and carried by said collector and, if desired, be provided with feet or like members, the inset container bearing on the inside against the bottom of the dust collector or shoulders, abutments or the like provided thereon. It is further suitable to provide the inset container with steering or centering members, e. g. in the form of bent flat springs or the like bearing against the inner walls of the dust collector. In a practical embodiment the inset container is formed as a conical bowl the upwardly directed mouth edge of which has, on the one hand, a diameter so much smaller than the inner diameter of the surrounding collector wall that the width of the annular slit thus formed will suffice for the passage of the suction air to the roof filter and, on the other hand, a diameter so much larger than that of the roof filter that the lighter dust particles collected on the surface of said filter cannot fall down into the ordinary dust collector.

The invention will in the following be more fully described with reference to the embodiments shown in Figs. 1 and 2 of the accompanying drawing from which the characteristic features of the invention will be seen.

Fig. 1 shows the invention as applied to that type of vacuum cleaner in which the motor-fan unit is placed beneath the roof filter, whereas the embodiment according to Fig. 2 relates to a type of vacuum cleaner with the motor-fan unit (not shown) arranged in the cover of the vacuum cleaner above the roof filter. However, the invention may obviously be applied with advantage also to other known vacuum cleaner types with roof filters, such as those in which the motor-fan unit is arranged in the cover of the apparatus at the side of the filter.

In Fig. 1 reference character 10 designates the cylindrical dust collector provided with an entry 11 for the suction conduit not shown. The stream of suction air entering through the opening 11 entrains both lighter dust and heavier solid particles, which latter, in a manner known per se, fall down directly into the collector 10, whereas the lighter dust particles are carried upwards by the air stream against the roof filter 13 retained by the cover 12 of the apparatus, the dust collecting on the underside of said filter, while the purified air, through the flue-shaped extension 14 of the inner wall 15 of the dust collector, flows further to the motor-fan unit 16 through which the air stream passes, before issuing again through the blow-out opening 17. When the collecting of dust on the underside of the roof filter has progressed for some time, as also when the agitator 18 is started during a pause in the operation of the apparatus, the collected dust loosens from the roof filter and falls to the bottom of the collector 10. According to the invention an inset container 19 has, however, been arranged in the path of the falling dust particles, said container surrounding coaxially, as shown in the figure, by its cylindrical inner wall 20 the flue-shaped air channel 14 and being in some measure governed by said channel, whereas the bottom of the container 19 bears against the upper edge of the extended part 15. Though a centering of the inset container has thus already been obtained, its upper mouth portion has been provided on the outside with three bent flat springs 21 bearing against the inner side of the ordinary dust collector 10. By choosing the diameter of the upper edge of the inset container somewhat smaller than the inner diameter of the dust collector it has been possible to obtain an annular slit 22 of constant width between the two containers, said slit serving as a passage opening for the dust-laden air to the filter 13 where the dust separation proper takes place. As the mouth surface of the inset container embraces the horizontal projection of the filter 13, it is obvious that all dust particles which fall down from the underside of the filter, after the motor-fan unit has been stopped and the agitator 18 started, will be caught by the inset container 19, which may, on removal of the cover 12, be lifted from its place for emptying purposes, if necessary. This will also make the interior of the ordinary dust collector 10 accessible, and its contents may, if desired, be conveniently utilized, which is of special importance in certain industries where it is desired to utilize in a rational way certain waste products, such as metal products, which are not dust-laden. It is evident that the inset container 19 may, if desired, instead of being loosely arranged inside the collector 10, be carried by the cover of the apparatus and, for this purpose, removably connected to said cover.

Fig. 2 shows a modification of the inset container according to Fig. 1 as applied to a vacuum cleaner with its motor-fan unit arranged in the cover of the apparatus. The ordinary dust collector of the apparatus is, in this case, designated by 23, and the inset container arranged therein by 24. 25 designates the entry of the suction conduit, and 26 the blow-out opening of the apparatus arranged in the cover 27. The filter 28 which, also in this case, comprises a roof filter partly projects down into the inset container 24 which, below, is provided with a number of legs or feet 29 resting on the inner bottom surface of the collector 23. Also in this case the upper part of the inset container is provided with a number of resilient distance members in the shape of bent flat springs 30 ensuring an annular slit 31 between the upper edge of the inset container and the inner wall of the surrounding collector 23. As appears from the figure, the diameter of the mouth of the inset container is in this case substantially larger than the largest diameter of the filter 28, which contributes still further to provide an efficient separation of the dust from the heavier particles falling directly into the collector 23. It is evident that the arrangement indicated above with the motor-fan unit placed at the side of the roof filter implies an analogous construction of the inset container which evidently, as in the two embodiments illustrated, is placed beneath the filter in such a manner that the mouth surface of the inset container embraces the horizontal projection of the filter, thus ensuring an efficient collecting of dust particles falling down from the underside of the filter.

Obviously the invention is not limited to the embodiments described above and shown in the drawing, but may be modified in several ways, without departing from the spirit of the invention. It is thus e. g. evident that the springs 21 and 30 may be replaced by any other distance members projecting from the inset container or the surrounding collector wall, or the annual slit 20 or 31 may be replaced by passage openings provided beneath the mouth edge of the inset container, in which case the mouth edge of the inset container may bear directly against the inner side of the collector 10 or 23 or be kept in place between said collector and the cover of the apparatus. The shape of the inset container may likewise be varied, though the above-mentioned shape possesses certain advantages, primarily from a manufacturing point of view and with respect to the facility of emptying and cleaning.

What I claim is:

1. In a vacuum cleaner having a cylindrical body portion, an intake opening near the upper part thereof, a removable cylindrical cover portion connected to the body by an air tight joint, a filter structure between the body and the cover and means for creating air flow into the body, through the filter and into the cylindrical cover, that improvement which comprises a conical dust pan of substantially the same projected extent as the filter removably supported closely adjacent the filter in the upper portion of the body and opposite the intake thereto, whereby heavy particles entrained by the entering air are deflected out of the air stream by the conical sides of the pan and the fine particles caught by the filter may fall into said pan.

2. In a vacuum cleaner having a cylindrical body portion, an intake opening near the upper part thereof, a removable cylindrical cover portion connected to the body by an air tight joint, a filter structure between the body and the cover and means for creating air flow into the body, through the filter and into the cylindrical cover, that improvement which comprises a conical dust pan of substantially the same projected extent as the filter removably supported closely adjacent the filter in the upper portion of the body and opposite the intake thereto, whereby heavy particles entrained in the entering air are generally deflected out of the air stream by the conical sides of the pan and fine particles caught by the filter may fall into said pan, and one or more resilient spacing members between said dust pan and said cylindrical body portion.

3. In a vacuum cleaner having a cylindrical body portion, an intake opening near the upper part thereof, a centrally disposed air flow tube, a removable cylindrical cover portion connected to the body by an air tight joint, a filter structure between the body and the cover and means for creating air flow into the body, through the filter and into the cylindrical cover, that improvement which comprises a conical dust pan of substantially the same projected extent as the filter removably supported closely adjacent the filter in the upper portion of the body and opposite the intake thereto, whereby heavy particles entrained in the entering air are deflected out of the air stream by the conical sides of the pan and fine particles caught by the filter may fall into said pan, said dust pan having a central tube slightly larger than said air flow tube for removable location therearound.

4. In a vacuum cleaner having a cylindrical body portion, an intake opening near the upper part thereof, a centrally disposed air flow tube, a removable cylindrical cover portion connected to the body by an air tight joint, a filter structure between the body and the cover and means for creating air flow into the body, through the filter and into the cylindrical cover, that improvement which comprises a conical dust pan of substantially the same projected extent as the filter removably supported closely adjacent the filter in the upper portion of the body and opposite the intake thereto, whereby heavy particles entrained in the entering air are deflected out of the air stream by the conical sides of the pan and fine particles caught by the filter may fall into said pan, said dust pan having a central tube slightly larger than said air flow tube for removable disposition therearound, and resilient spacing members between said dust pan and said cylindrical body portion.

AXEL ALBERT FORSBERG.